United States Patent
Pluta et al.

(10) Patent No.: US 10,421,374 B2
(45) Date of Patent: Sep. 24, 2019

(54) FORWARD PIVOT MECHANISM FOR A VEHICLE SEAT, AND VEHICLE SEAT

(71) Applicant: Johnson Controls Components GmbH & Co. KG, Kaiserslautern (DE)

(72) Inventors: Wolfgang Pluta, Heiligenmoschel (DE); Christian Wolf, Dielkirchen (DE); Thomas Dill, Heiligenmoschel (DE); Thomas Christoffel, Herschweiler-Pettersheim (DE)

(73) Assignee: ADIENT LUXEMBOURGH HOLD S.A.R.L., Luxembourg (LU)

( * ) Notice: Subject to any disclaimer, the term of this patent is extended or adjusted under 35 U.S.C. 154(b) by 209 days.

(21) Appl. No.: 15/100,750

(22) PCT Filed: Dec. 2, 2014

(86) PCT No.: PCT/EP2014/076160
§ 371 (c)(1),
(2) Date: Jun. 1, 2016

(87) PCT Pub. No.: WO2015/082426
PCT Pub. Date: Jun. 11, 2015

(65) Prior Publication Data
US 2016/0297328 A1 Oct. 13, 2016

(30) Foreign Application Priority Data

Dec. 2, 2013 (DE) .................. 10 2013 224 689
Apr. 23, 2014 (DE) .................. 10 2014 207 606

(51) Int. Cl.
*B60N 2/20* (2006.01)
*B60N 2/12* (2006.01)
(Continued)

(52) U.S. Cl.
CPC ............... *B60N 2/20* (2013.01); *B60N 2/12* (2013.01); *B60N 2/206* (2013.01); *B60N 2/2227* (2013.01);
(Continued)

(58) Field of Classification Search
None
See application file for complete search history.

(56) References Cited

U.S. PATENT DOCUMENTS 7,152,923 B2 * 12/2006 Charras ................. B60N 2/206
297/378.12
7,380,885 B2 * 6/2008 Fischer .................... B60N 2/20
297/362
(Continued)

FOREIGN PATENT DOCUMENTS

DE 10 2004 008 599 B3 6/2005
DE 10 2004 015 450 A1 11/2005
(Continued)

OTHER PUBLICATIONS

Office Action dated Apr. 1, 2017, received in corresponding Chinese application No. 201480065864.X, (6 pages) and English translation (6 pages).
(Continued)

*Primary Examiner* — David E Allred
(74) *Attorney, Agent, or Firm* — Foley & Lardner LLP (57) ABSTRACT

The invention relates to a forward pivot mechanism for positioning a seat back of a vehicle seat into at least one forward position and for positioning the seat back beyond the forward position into at least one further forward position, comprising a comfort lock for positioning and locking the seat back into a least one seated position, and comprising an easy entry latch for positioning the seat back into the at least one forward position, wherein a pivot range of the seat
(Continued)

back into one of the forward positions can be limited by means of the easy entry latch, wherein the easy-entry latch is designed in such a way that it forms a forward limit stop during the shifting of the seat back from one of the seated positions into one of the forward positions.

18 Claims, 12 Drawing Sheets

(51) Int. Cl.
 *B60N 2/235* (2006.01)
 *B60N 2/22* (2006.01)
 *B60N 2/90* (2018.01)
(52) U.S. Cl.
 CPC ......... *B60N 2/2352* (2013.01); *B60N 2/2356* (2013.01); *B60N 2/938* (2018.02); *B60N 2002/952* (2018.02)

(56) References Cited

U.S. PATENT DOCUMENTS

| | | | |
|---|---|---|---|
| 2003/0080601 A1 | 5/2003 | Charras et al. | |
| 2006/0119158 A1* | 6/2006 | Haverkamp | B60N 2/3011 297/378.1 |
| 2010/0026069 A1* | 2/2010 | Bruck | B60N 2/20 297/344.1 |
| 2010/0141007 A1* | 6/2010 | Kienke | B60N 2/206 297/367 R |
| 2013/0057041 A1* | 3/2013 | Ngiau | B60N 2/12 297/354.12 |
| 2015/0202996 A1* | 7/2015 | Kajale | B60N 2/206 297/363 |
| 2016/0176323 A1 | 6/2016 | Pluta et al. | |
| 2016/0347209 A1* | 12/2016 | Pluta | B60N 2/12 |

FOREIGN PATENT DOCUMENTS

| | | | | |
|---|---|---|---|---|
| DE | 102004042038 A1 * | 3/2006 | | B60N 2/0818 |
| DE | 10 2011 012 562 A1 | 8/2012 | | |
| DE | 102011012562 A1 * | 8/2012 | | B60N 2/20 |
| DE | 10 2013 221 925 B3 | 9/2014 | | |
| DE | 102013221925 B3 * | 9/2014 | | B60N 2/12 |
| EP | 1 302 361 A1 | 4/2003 | | |
| JP | 2003-159140 A | 6/2003 | | |
| WO | WO-2005/108152 A2 | 11/2005 | | |
| WO | WO-2006042959 A2 * | 4/2006 | | B60N 2/206 |
| WO | WO-2012022427 A2 * | 2/2012 | | B60N 2/123 |

OTHER PUBLICATIONS

Office Action dated May 22, 2017, received in corresponding Korean application No. 10-2016-7017343, (7 pages) and English translation (9 pages).
International Search Report in PCT/EP2014/076160 dated Feb. 16, 2015, 5 pages.
Written Opinion of the International Searching Authority in PCT/EP2014/076160 dated Feb. 16, 2015, 5 pages.
Office Action dated Jan. 11, 2018, received in corresponding German Patent Application No. 10 2014 207 606.4, (6 pages) and English translation (5 pages).

\* cited by examiner

FORWARD PIVOT MECHANISM FOR A VEHICLE SEAT, AND VEHICLE SEAT

CROSS REFERENCE TO RELATED APPLICATIONS

The present application is a U.S. National Stage of International Application No. PCT/EP2014/076160 filed on Dec. 2, 2014, which claims the benefit of German Patent Application Nos. 10 2013 224 689.7 filed on Dec. 2, 2013, and 10 2014 207 606.4 filed on Apr. 23, 2014, the entire disclosures of all of which are incorporated herein by reference.

The invention relates to a forward pivot mechanism, in particular to an easy-entry system, for a vehicle seat, and to a vehicle seat with such a forward pivot mechanism, in particular with an easy-entry system.

The prior art has disclosed various easy-entry systems which are part of a vehicle seat and permit facilitated entry into a second seat row of a vehicle. The easy-entry system is actuatable by means of a release lever which is conventionally arranged on a backrest upper edge of the vehicle seat, as a result of which the backrest of the vehicle seat pivots out of an entry region. If the vehicle seat is arranged on rails, when the release lever is actuated the vehicle seat is additionally or alternatively displaceable in the direction of travel. Furthermore, the vehicle seat has a comfort adjustment of the backrest and a loading floor function. These two functions are actuatable by means of a comfort lever.

It is an object of the present invention to specify a forward pivot mechanism which is improved in relation to the prior art, in particular a simplified easy-entry system, for a vehicle seat, and a vehicle seat with such an improved forward pivot mechanism, in particular an easy-entry system.

This object is achieved in respect of the forward pivot mechanism by the features of claim 1. In respect of the vehicle seat, the invention is achieved by the features specified in claim 9.

The forward pivot mechanism according to the invention for positioning a backrest of a vehicle seat into at least one forward position, in particular into an easy-entry position, and for positioning the backrest beyond the forward position into at least one further forward position, in particular a loading floor position, comprises a comfort locking for positioning and locking the backrest into/in at least one seat position, and an easy-entry detent for positioning the backrest into the at least one forward position, wherein a pivoting range of the backrest into the at least one forward position is limitable by means of the easy-entry detent, wherein the easy-entry detent is designed in such a manner that, during the adjustment of the backrest from one of the seat positions into one of the forward positions, said easy-entry detent forms a stop to the front.

In order to achieve the limiting of the pivoting range of the backrest, the easy-entry detent is switchable, in particular is bringable into a position in which a locking hook or a locking detent of the easy-entry detent comes into engagement with an end stop.

In one possible embodiment of the invention, the end stop is provided on the backrest side, in a manner corresponding to the stop of the easy-entry detent, said end stop interacting in a self-locking manner with the stop, in particular with the locking hook or the locking detent, of the easy-entry detent in the forward position of the backrest.

According to a development, the easy-entry detent is coupled to a fitting lower part in a pivotable and spring-loaded manner. By means of a spring element arranged in the region of the axis of rotation of the easy-entry detent, in particular a flexible spring, for example a spiral spring, after release of the backrest from one of the seat positions and during the pivoting of the backrest forward, the easy-entry detent is bringable, in particular pivotable, into a position in which the locking hook or the locking detent acts as a stop in order to limit a further pivoting of the backrest forward.

During the raising again of the backrest from the forward position, in particular an easy-entry position or loading floor position, into one of the seat positions within the comfort range, the end stop is in engagement with a softlock in such a manner that a softlock force is greater than a longitudinal/ rail adjustment force of the vehicle seat. This ensures that the vehicle seat can first of all be placed, in particular moved, into a rear or rearmost position by means of longitudinal adjustment before the backrest is pivoted into the seat position within the comfort range.

In a possible embodiment, the softlock is designed as an L profile which has at least one outer contour with at least one control cam or switching cam, in particular in the form of a projection, which interacts with the end stop. According to an embodiment, the softlock is coupled to the fitting lower part in a pivotable and spring-loaded manner, in particular in a resiliently prestressed manner.

During the sliding of the end stop, in particular of a rolling element arranged on the end stop, on the outer contour of the softlock, the switching cam and a spring force, in particular a softlock spring, for example in the form of a restoring spring, have to be overcome, as a result of which the softlock force is defined or determined. The switching cam here can have different inclinations in such a manner that the softlock forces in effect during the pivoting of the backrest forward or rearward differ. Alternatively, the inclinations of the switching cam may be of identical design in the pivoting direction forward and rearward, and therefore said softlock force has to be overcome in both pivoting directions of the backrest. The softlock spring/restoring spring is coupled in particular at one end to the softlock and at the other end to the fitting lower part.

In an alternative embodiment, the softlock can be extended in such a manner that, in one of the forward positions of the backrest, the latter is held by a self-locking interaction of end stop and softlock. In particular, the extended softlock has a locking cam, in particular a locking projection, in the outer contour in the region of the extension. Alternatively, the locking cam can be arranged on an inner contour of the softlock.

A vehicle seat according to the invention with an inclination-adjustable and freely pivotable backrest and a longitudinal adjuster has the previously described forward pivot mechanism for adjusting the inclination and for the free pivoting of the backrest by means of a switchable easy-entry detent and with an integrated softlock function by means of a softlock. The longitudinal adjuster and the forward pivot mechanism interact here in such a manner that, when a backrest is pivoted forward in one of the forward positions, the vehicle seat is firstly movable rearward before the backrest is pivoted back into a seat position, by the softlock force being greater than a longitudinal adjustment force.

The object is furthermore achieved according to the invention with a fitting which interacts with a forward pivot mechanism, in particular an easy-entry system and/or a loading system, for positioning a backrest of a vehicle seat into at least one forward position, in particular into an easy-entry position and/or a loading position, with a comfort locking for positioning the backrest into at least one seat position, and with an extended comfort function for positioning the backrest beyond the forward position, in particular the easy-entry position and/or a loading position, into a loading floor position, wherein a pivoting range of the backrest is limited in the forward position, in particular in the easy-entry position and/or loading position, by means of an easy-entry detent engaging in the at least one fitting part, wherein the easy-entry detent is designed in such a manner that, during the adjustment of the backrest from the comfort range into a forward position, in particular into the easy-entry position and/or the loading position, said easy-entry detent is pivoted in such a manner that, in the easy-entry position, the easy-entry detent forms a stop forward, wherein, when the backrest is raised out of said forward position, in particular out of the easy-entry position and/or the loading position, into one of the seat positions within the comfort range, the easy-entry detent is in engagement with a softlock in such a manner that a softlock force is greater than a longitudinal adjustment force of the vehicle seat.

The invention makes it possible for the vehicle seat to move from a forward longitudinal position into a rear or rearmost longitudinal position before the backrest of the vehicle seat is positioned or pivoted out of the forward position, such as the easy-entry position or the loading position, into one of the seat positions within the comfort range. This increases the user safety since a suitable, in particular lockable traveling or longitudinal position of the vehicle seat is arrived at. Furthermore, it is ensured by means of the easy-entry detent, which is configured as a stop in the forward position of the backrest, that the backrest is prevented from pivoting further forward.

Exemplary embodiments of the invention are described in greater detail below with reference to the attached schematic figures, in which.

Mutually corresponding parts are provided with the same reference signs in all of the figures.

Figure 1:
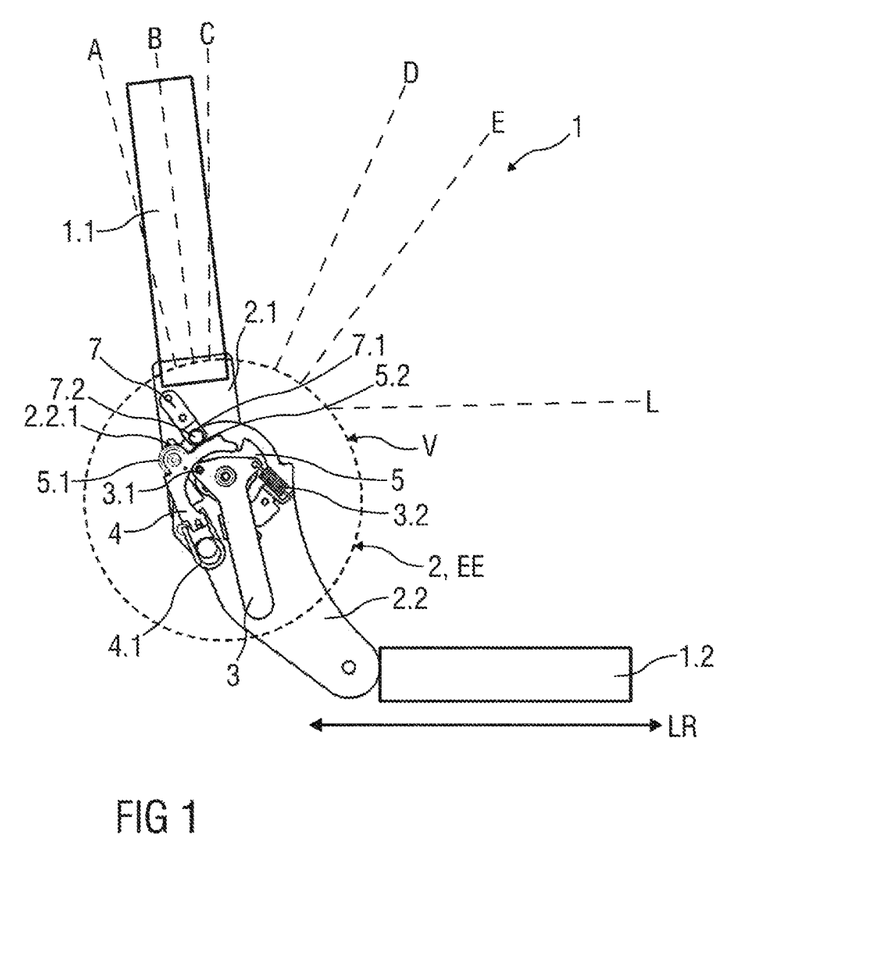
FIG. 1 schematically shows a vehicle seat with a fitting according to the invention, FIGS. 2 to 12 schematically show a fitting according to the invention in various states.

FIG. 1 schematically shows in side view part of a vehicle seat 1 with a backrest 1.1 and a seat cushion 1.2 in the region of a fitting 2, wherein the backrest 1.1 is arranged on the seat cushion 1.2 so as to be rotatable by means of the stop 2.

The fitting 2 has a forward pivot mechanism V which is configured to operate at least one function, in particular an entry aid (easy-entry-system) or a loading aid. Depending on the function, the fitting 2 comprises an easy-entry detent 5 as entry aid or a locking lever as loading aid. The two functions differ here only in the angle of inclination when the backrest 1.1 is pivoted forward. The easy-entry detent 5 or the locking lever are designed with inner or outer guiding, locking and/or control contours so as to correspond to the respectively integrated functions.

The invention is described below for a forward pivot mechanism V which is designed as an easy-entry system EE with an easy-entry position D as forward position. The invention is applicable analogously to a forward pivot mechanism V (not illustrated specifically) which is designed as a loading system, wherein a correspondingly designed and configured locking lever is provided instead of the easy-entry detent 5.

The vehicle seat 1 is, for example, a front seat or a vehicle seat of a rear seat row, for example a second seat row, for a vehicle and is arranged on a rail system, as a result of which the vehicle seat 1 is displaceable in the longitudinal direction LR of the vehicle by means of a longitudinal adjuster (not illustrated specifically).

In order to simplify entry into a rear region or a rear seat row of the vehicle, the vehicle seat 1 has an easy-entry function which is implementable by means of an easy-entry system EE of the fitting 2.

The easy-entry function is an entry aid which permits enlarged and therefore more comfortable access to the rear region, in particular of a two-door vehicle, or to a rear seat row of a multi-door vehicle. By means of the easy-entry system EE, the vehicle seat 1 is displaced forward on the rail system in the longitudinal direction LR, in particular in the direction of travel, in order to enlarge the entry region, wherein at the same time the backrest 1.1 of the vehicle seat 1 is folded forward into an easy-entry position D. A pivoting range of the backrest 1.1 is limited here forward, for example up to 35°, when the easy-entry function is triggered.

Furthermore, the backrest 1.1 can be pivoted into a further comfort position, in particular into a loading position E and/or a loading floor position L, by means of an extended comfort function.

The backrest 1.1 is pivotable about a pivot axis which runs in the direction of transverse extent of the vehicle. The pivoting of the backrest 1.1 is triggerable by actuation of an actuating lever (not illustrated specifically) which is coupled at a coupling point 3.1 to a release lever 3, which is spring-loaded by a restoring spring 3.2, of the easy-entry system EE via a Bowden cable (not shown) or another suitable tension element. The actuating lever is provided only on one side of the vehicle seat 1.

A fitting 2 which is formed from a fitting upper part 2.1 and a fitting lower part 2.2 is arranged on each side of the vehicle seat 1. Alternatively, only one fitting 2 may be provided, wherein a rotary bearing for a transmission rod is provided on the opposite side of the vehicle seat 1.

The fitting upper part 2.1 is fastened to the backrest 1.1 in a manner fixed thereon, and the fitting lower part 2.2 is arranged fixed on the substructure, for example fastened to the vehicle floor or to the seat cushion 1.2. The fitting 2, in particular a rotary and/or latching fitting, is designed as a geared connection in such a manner that a rotational movement takes place in a relative manner between the fitting upper part 2.1 and the fitting lower part 2.2.

The fittings 2 which are arranged on each side of the backrest 1.1 are coupled to each other via a transmission element (not illustrated specifically) in the form of an angled transmission rod or a tube such that a locking of the backrest 1.1 can be cancelled on both sides in order to be able to pivot the latter. A fitting 2 is fastened here to one end of the transmission element with a form fit. Alternatively, a fitting 2 can be arranged only on one side of the vehicle seat 1, and a rotary bearing for accommodating the transmission element is provided on the opposite side of the vehicle seat 1.

The transmission element is in particular a rod or a tube which connects the fitting component to a further fitting component which may be present, wherein the transmission element is rotatable about its longitudinal axis, as is known from DE 10 2004 008 599 B3.

The forward pivot mechanism V comprises the easy-entry system EE and the extended comfort function for the loading position E and/or the loading floor position L, which are integrated in the fitting 2 and are illustrated in more detail in FIG. 1.

The easy-entry system EE comprises a softlock 4 which is arranged rotatably on the fitting 2 and is spring-loaded with an associated restoring spring 4.1, and the release lever 3 which is likewise arranged rotatably on the fitting 2, and also the easy-entry detent 5. Furthermore, the easy-entry system EE comprises an end stop 7 on the backrest side.

In the exemplary embodiment shown, the softlock 4 and the release lever 3 are rotatable about a separate rotation and pivot axis, and the softlock 4 and the easy-entry detent 5 are rotatable about a common rotation and pivot axis. The softlock 4 is designed in the manner of a lever or an L profile.

By actuating an easy-entry actuation lever (not illustrated), the release lever 3 is actuated for triggering an adjustment function within the comfort range in the seat positions A to C, as a result of which the backrest 1.1 can be pivoted from a seat position A via seat positions B and C (also called comfort, use or backrest positions) or vice versa.

The adjustment and positioning of the backrest 1.1 rearward and therefore into the seat position A is limited here by the end stop 7 which is on the backrest side, in particular is fixed to the backrest, and stops against a stop 2.2.1 of the fitting lower part 2.2.

The end stop 7 which is on the backrest side and is fixed to the backrest comprises a receptacle 7.1 for a rolling element 7.2. Within the comfort range and therefore within the adjustment range of the backrest 1.1 between the seat positions A to C (rear comfort position, middle comfort position, forward comfort position), the ruling element 7.2 of the end stop 7 and the softlock 4 are decoupled from each other and are not in contact. Furthermore, the rails of the rail system of the vehicle seat 1 and the fitting 2 are closed.

In the comfort seat range of the backrest 1.1 with the seat positions A to C, wherein the seat position A represents the rearmost comfort seat position, the seat position B represents the middle comfort seat position or starting or design seat position, and the seat position C represents the frontmost comfort seat position, the easy-entry detent 5 bears with a stop contour, which is designed as an outer contour 5.2, against the end stop 7 of the fitting upper part 2.1, in particular against the rolling element 7.2. The rolling element 7.2 of the end stop 7 fixed to the backrest is formed as a stop surface which protrudes from the surface of the fitting upper part 2.1, in particular as a stop roller or a stop pin. Alternatively, the end stop 7 may be formed separately as a profile element, in particular as an L-shaped profile, and may be fastened, in particular welded, to the fitting upper part 2.1.

Figure 2:
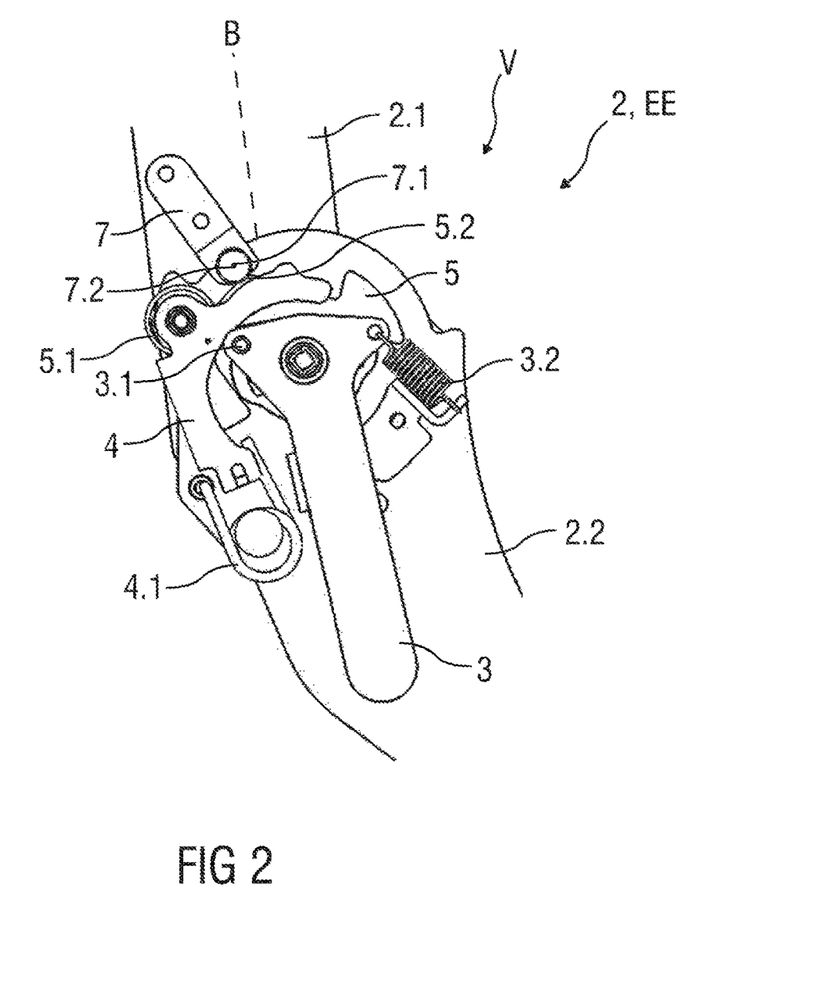
Figure 3:
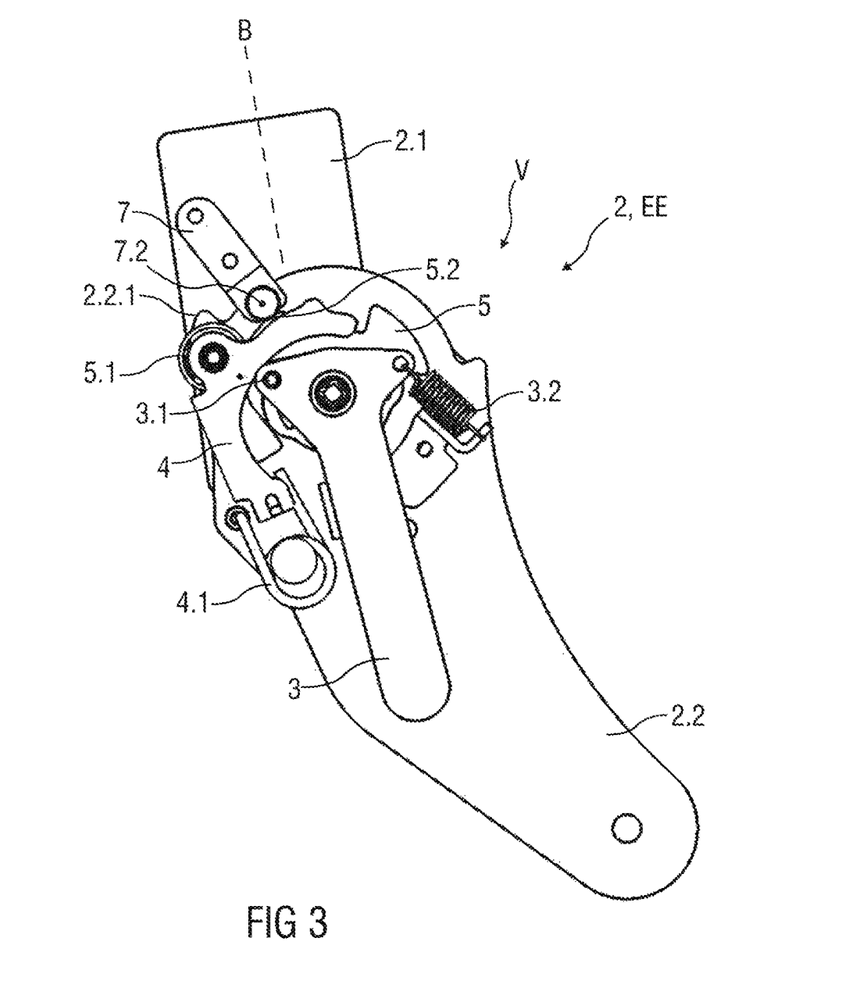

FIGS. 2 and 3 show the backrest 1.1 in the seat position B of an average comfort position or normal position within the comfort range. In this backrest or seat position B, the rail and the fitting 2 are closed. The softlock 4 and the end stop 7 are decoupled. The rolling element 7.2 bears against the outer contour 5.2 of the easy-entry detent 5.

Figure 4:
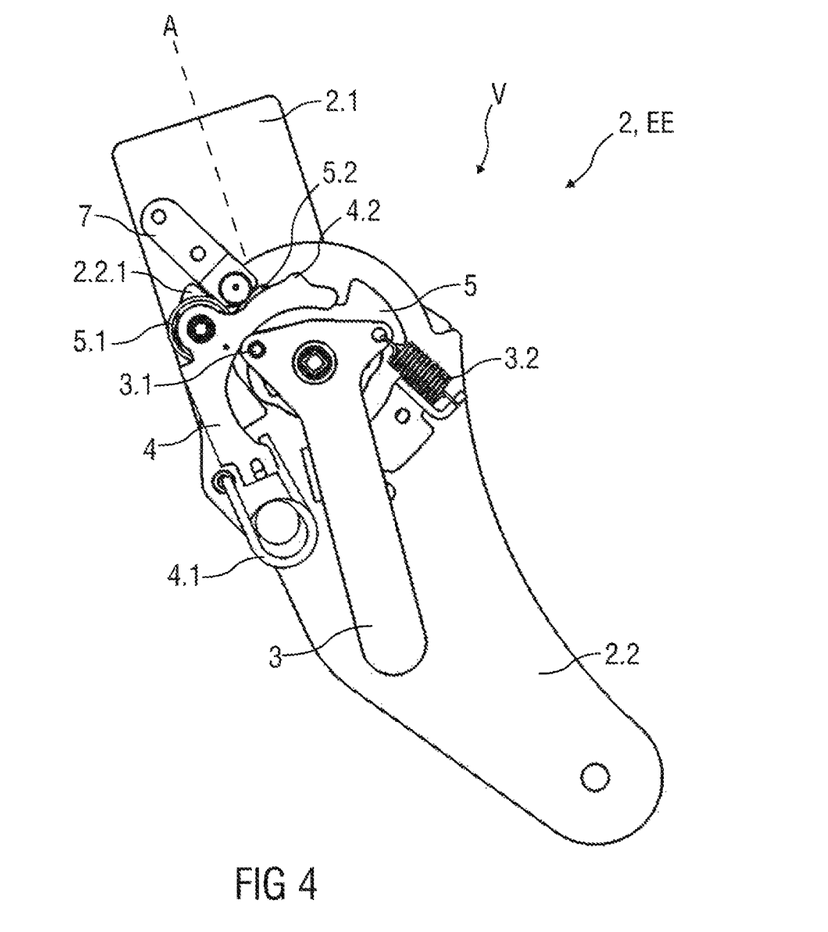

FIG. 4 shows the backrest 1.1 in the rear seat position A of a rear comfort position within the comfort range. In this backrest or seat position A, the rail and the fitting 2 are closed. The softlock 4 and the end stop 7 are decoupled. The end stop 7 strikes against a stop 2.2.1, which is on the floor or seat part side/is fixed to the floor or the seat part, of the fitting lower part 2.2 and therefore limits the adjustment of the backrest 1.1 rearward.

Figure 5:
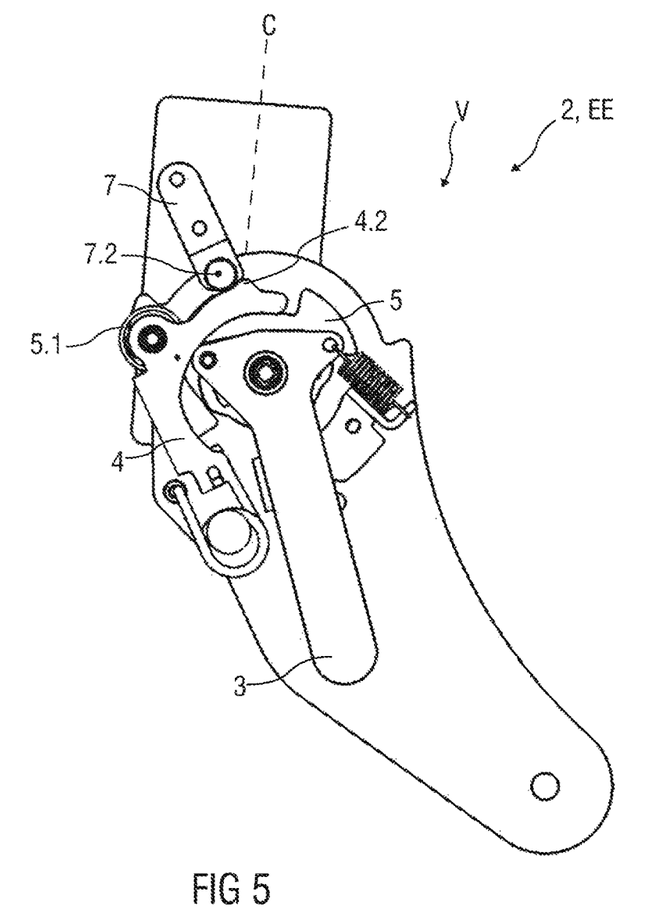

FIG. 5 shows the backrest 1.1 in the forward seat position C of a forward comfort position within the comfort range. In this backrest or seat position C, the rail and the fitting 2 are closed. The softlock 4 and the end stop 7 are decoupled at least in regions, in particular are decoupled until the rolling element 7.2 protruding from the end stop 7 strikes against a control contour 4.2 (also called switching contour), in particular a projection protruding from the outer contour, of the softlock 4.

Figure 6:
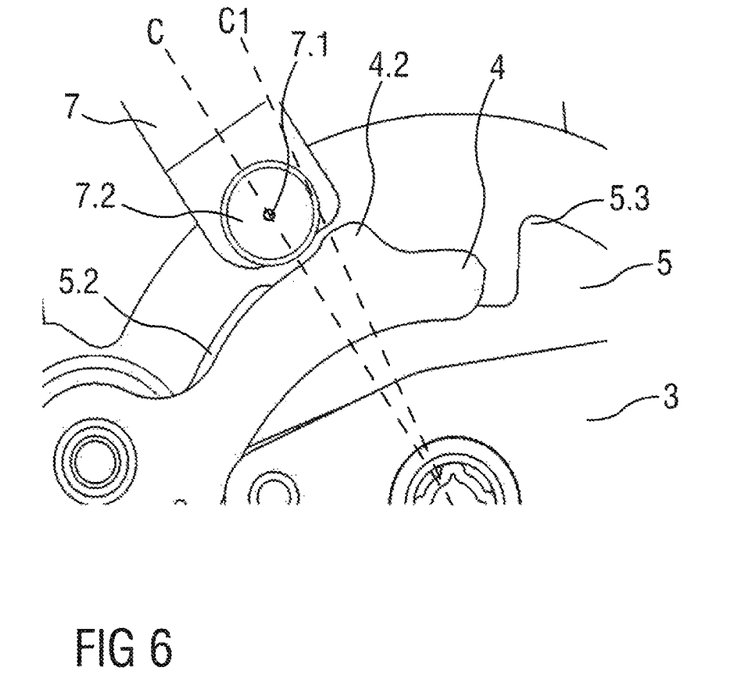
Figure 7:
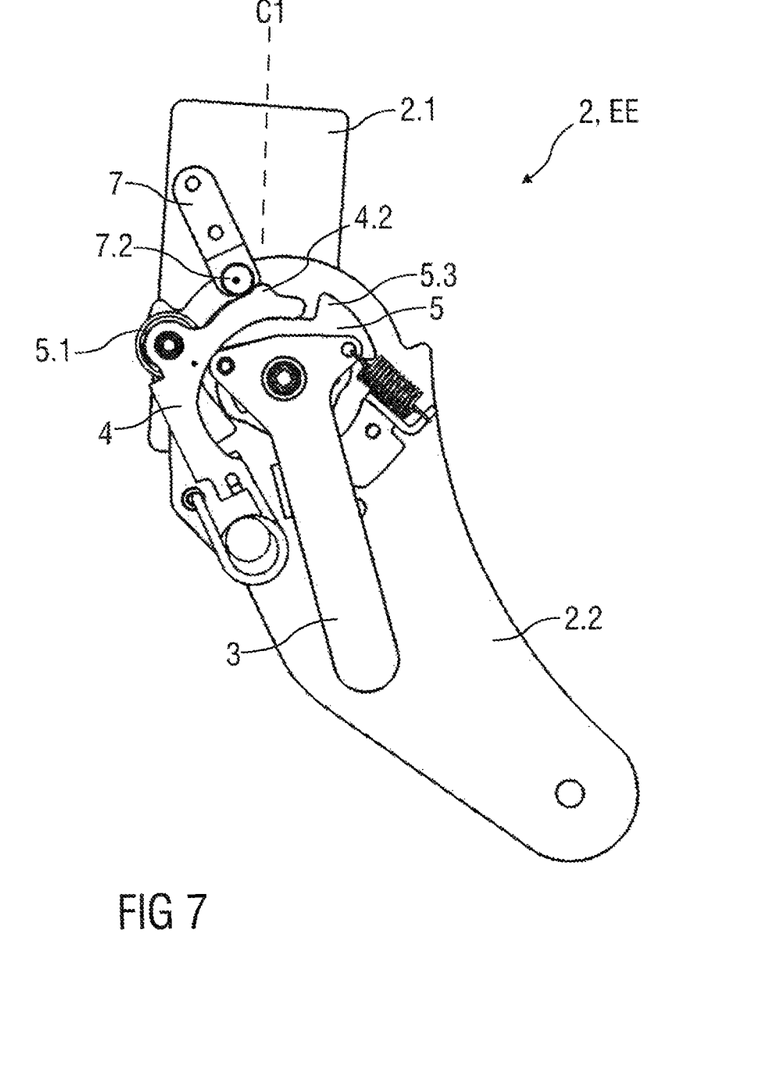

FIGS. 6 and 7 shows the positions and the movement of the end stop 7 relative to the softlock 4 and the control contour 4.2 from the forward seat position C as far as the starting position C1 for a freely pivoting movement of the backrest 1.1 out of the comfort range into the easy-entry position D or the loading position E or the loading floor position L. In the exemplary embodiment, the control contour 4.2 is designed as a profiled outer contour along which the rolling element 7.2 is guided. Alternatively, the rolling element 7.2 can be guided in the manner of a pin in an inner contour of the softlock 4.

For setting the backrest 1.1 forward into the easy-entry position D in particular approx. 35° forward, the spring force of the restoring spring 4.1 (also called softlock spring) of the prestressed softlock 4 has to be overcome. For this purpose, the release lever 3 is actuated, and the backrest 1.1 is pivoted out of the comfort range forward from the forward seat position C in the direction of the starting position C1, wherein the fitting 2 is opened. The rail (not illustrated) is unlocked at the same time via a Bowden cable (not illustrated) so that the vehicle seat 1 can be moved further forward.

Figure 8:
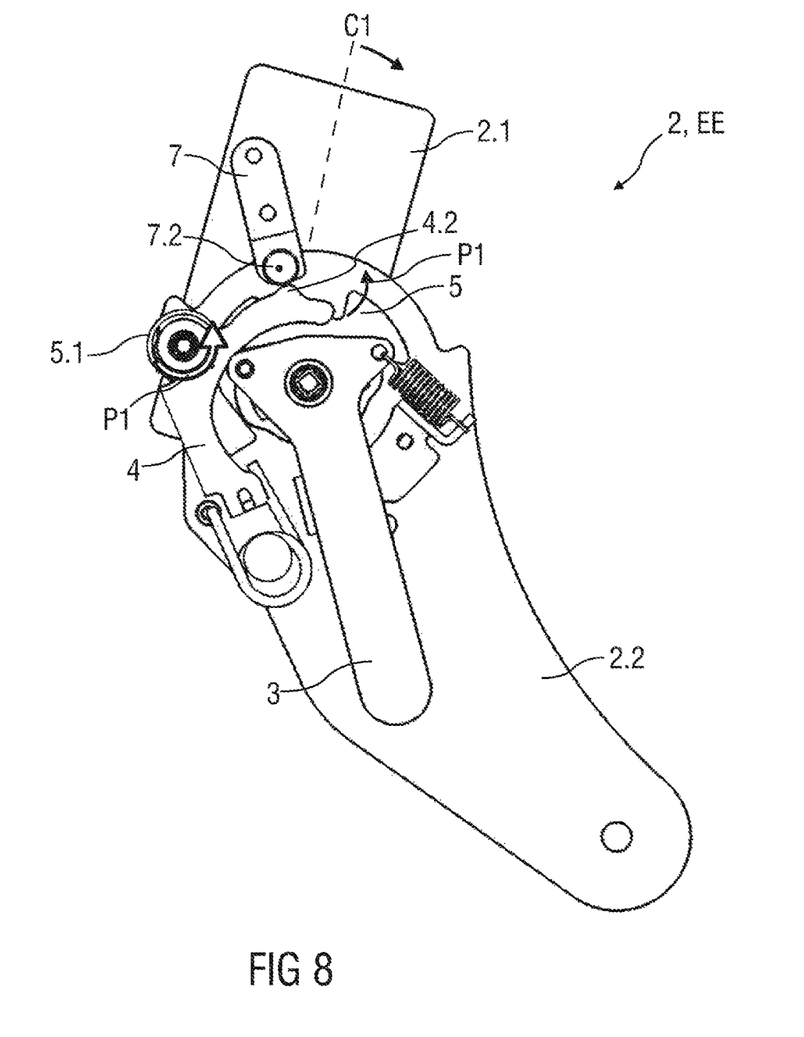

Only when the backrest 1.1 is transferred or pivoted out of the frontmost comfort position or seat position C into the easy-entry position D is the softlock function of the softlock 4 actuated by coupling, in particular by end stop 7 and softlock 4 acting on each other, as shown in FIG. 8.

Figure 9:
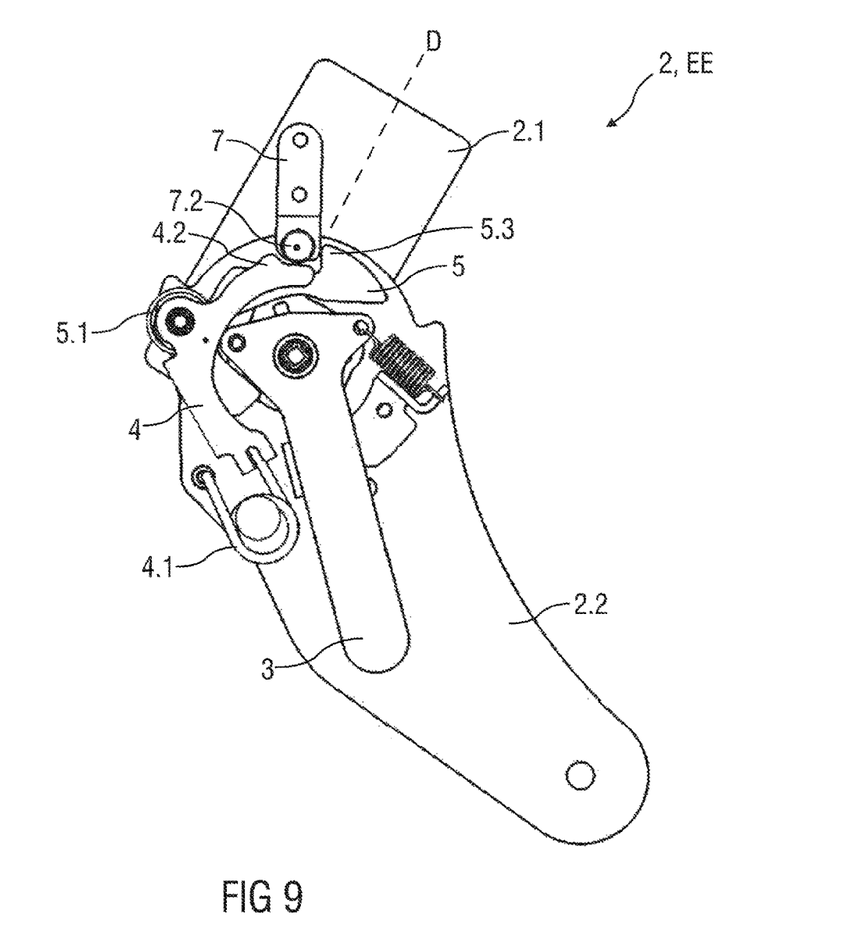
Figure 10:
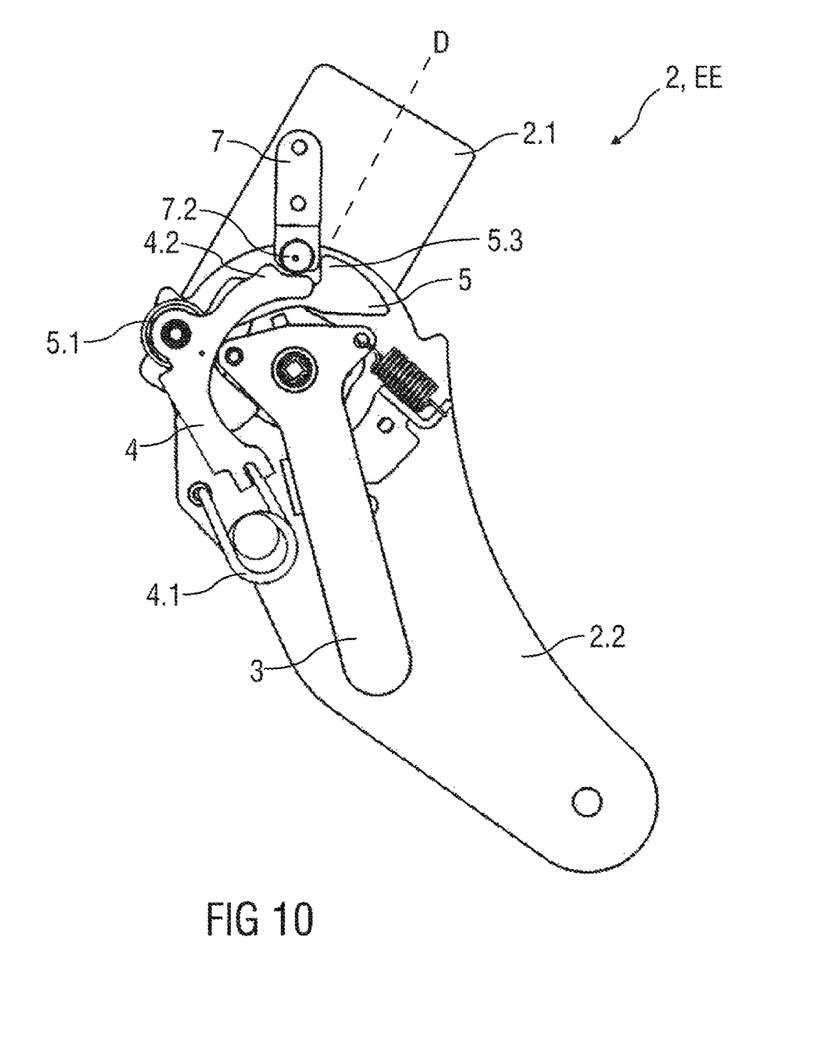

By means of a spring element 5.1 coupled to the easy-entry detent 5 and/or to the softlock 4, the easy-entry detent 5 is rotated upward along the arrows P1 and serves as a stop to the front (=self-locking action), as illustrated in FIGS. 8 to 10. For this purpose, the easy-entry detent 5 comprises a locking detent 5.3. The easy-entry position D is reached.

In order to pivot the backrest 1.1 back again into a seat position A to C and therefore into the comfort range, the control contour 4.2 and a softlock force resulting therefrom, in particular a force resulting from the coupling of the end stop 7 and the softlock 4, are overcome during the pivoting rearward. No actuation of the release lever 3 is necessary for this purpose (FIG. 10).

In a possible embodiment, the softlock force is greater than the rail adjustment force. It is thereby ensured that the vehicle seat 1 first of all moves along the rail back into a rear/rearmost position before the backrest 1.1 is set into the forward seat position C or reaches the latter. This serves to protect the user since a suitable moving or longitudinal position of the vehicle seat 1 in the rail is ensured (locked).

Figure 11:
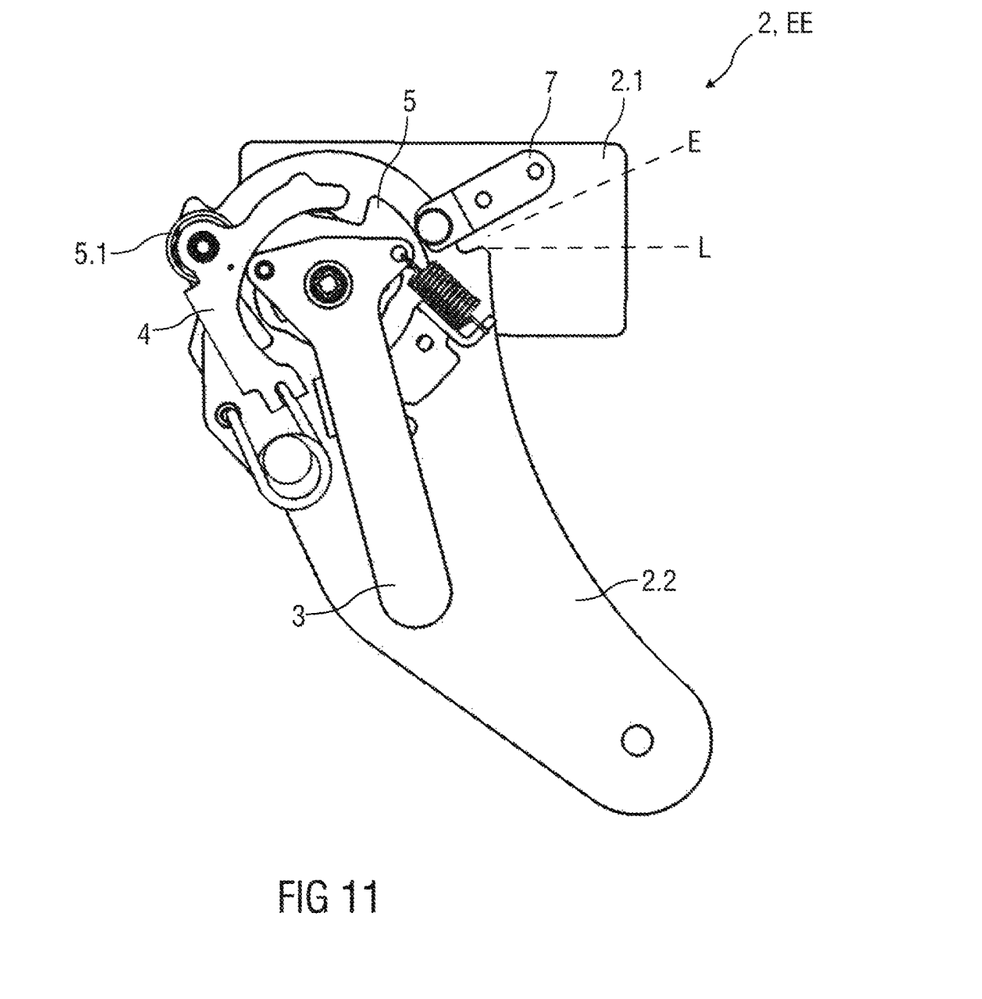

In order to reach the loading position E or the loading floor position L (also called folding position), the release lever 3 has to be actuated again. As a result, the easy-entry detent 5 is lowered, and therefore the backrest 1.1 can be folded further forward, as illustrated in FIG. 11. The fitting lower part 2.2, in particular a projection, then serves again as the stop.

Alternatively, a latching function can be used in the fitting 2, as a result of which higher forces are possible.

Figure 12:
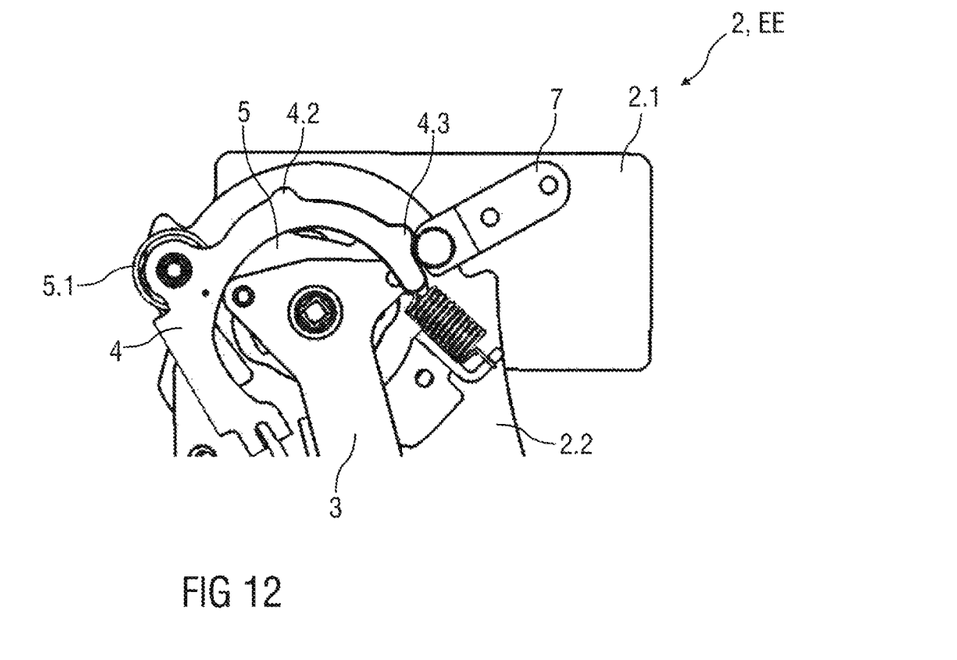

In order to leave the loading position E or loading floor position L (flap position), the release lever 3 can either be actuated or not (either with or without a latching function). As an alternative to the latching function in the fitting 2, the softlock 4 can be modified, in particular extended, in order to reach a holding function in the loading floor position L (same principle as easy-entry position), as shown in FIG. 12. The softlock 4 has a locking cam 4.3 in the outer contour in the region of the extension, as a result of which the end stop 7 and the softlock 4 interact in a self-locking manner. As an alternative to the molding of the locking cam 4.3 on the outer contour of the softlock 4, the locking cam 4.3 may also be formed on the inner contour of the softlock 4.

In summary, entry into a seat row located at the rear is facilitated in the easy-entry position D. For this purpose, the backrest 1.1 is pivoted out of one of the seat positions A to C into a forward position, the easy-entry position D (for example approx. 35° forward) and at the same time the longitudinal adjustment rails are opened, as a result of which the vehicle seat 1 can be moved forward in order to permit a maximum entry region.

In the "folding position", the loading volume of the motor vehicle is maximized. For this purpose, the backrest 1.1 is folded or pivoted forward into the loading floor position L in order to produce a flat loading area.

A freely pivoting position or movement (free swing) is understood as meaning in particular the state of the backrest 1.1 in which the fitting 2 is open and the backrest 1.1 can pivot, without the release lever 3 being actuated.

LIST OF REFERENCE SIGNS

1. Vehicle seat
1.1 Backrest
1.2 Seat cushion
2 Fitting
2.1 Fitting upper part
2.2 Fitting lower part
2.2.1 Stop
3. Release lever
3.1 Coupling point
3.2 Restoring spring
4 Softlock
4.1 Restoring spring
4.2 Control contour
4.3 Locking cam
5. Easy-entry detent
5.1 Spring element
5.2 Outer contour
5.3 Locking detent
7 End stop
7.1 Receptacle
7.2 Rolling element
EE Easy-entry system
A to C Seat positions
C1 Starting position
D Easy-entry position
E Loading position
L Loading floor position
LR Longitudinal direction
P1 Arrows
V Forward pivot mechanism

The invention claimed is:

1. A forward pivot mechanism for positioning a backrest of a vehicle seat into at least one forward position and for positioning the backrest beyond the forward position into at least one further forward position, the forward pivot mechanism comprising:
   a comfort locking mechanism for positioning and locking the backrest into at least one of a plurality of seat positions;
   an easy-entry detent for positioning the backrest into the at least one forward position, the easy-entry detent comprising a locking detent and a contour that includes an easy-entry projection;
   an end stop located on the backrest and configured to engage the easy-entry detent; and
   a softlock component comprising a contour that includes at least one softlock projection,
   wherein a pivoting range of the backrest into one of the forward positions is limitable by the easy-entry detent, wherein the easy-entry detent is designed in such a manner that, during the adjustment of the backrest from one of the seat positions into one of the forward positions, the locking detent of the easy-entry detent acts as a front stop when the easy-entry detent is brought into a position in which the locking detent comes into engagement with the end stop, which holds the backrest in the at least one forward position,
   wherein the end stop strikes against a separate rear stop in a rearmost seat position, wherein the separate rear stop is fixed to one of a floor or a seat part and limits the amount of rearward adjustment of the backrest,
   wherein the easy-entry detent is a separate component from the separate rear stop.

2. The forward pivot mechanism as claimed in claim 1, wherein the end stop is provided on the backrest in a manner corresponding to the locking detent of the easy-entry detent.

3. The forward pivot mechanism as claimed in claim 1, wherein the easy-entry detent is coupled to a fitting lower part in a pivotable and spring loaded manner.

4. The forward pivot mechanism as claimed in claim 2, wherein, when the backrest is raised from one of the forward positions into one of the seat positions within a comfort range, the end stop is in engagement with the softlock component in such a manner that a softlock force is greater than a longitudinal adjustment force of the vehicle seat.

5. The forward pivot mechanism as claimed in claim 4, wherein the softlock component is designed as an L profile which has at least one outer contour with at least one control cam which interacts with the end stop.

6. The forward pivot mechanism as claimed in claim 4, wherein the softlock component is coupled to the fitting lower part in a pivotable and spring loaded manner.

7. The forward pivot mechanism as claimed in claim 5, wherein, during the pivoting of the backrest into the at least one forward position, the end stop slides along the outer contour of the softlock component, wherein the softlock force is determined by the molding of the control cam and/or a spring force of a restoring spring of the softlock component.

8. The forward pivot mechanism as claimed in claim 4, wherein the softlock component is extended in such a manner that, in a further one of the forward positions of the backrest, the latter is held by a self locking interaction of the end stop and the softlock component.

9. A vehicle seat with an inclination adjustable and freely pivotable backrest and a longitudinal adjuster, comprising a forward pivot mechanism as claimed in claim 1 for adjusting the inclination and for the free pivoting of the backrest.

10. The vehicle seat as claimed in claim 9, wherein the longitudinal adjuster and the forward pivot mechanism interact in such a manner that, when a backrest is pivoted forward in one of the forward positions, the vehicle seat is firstly movable rearward before the backrest pivots back into a seat position.

11. The forward pivot mechanism as claimed in claim 1, wherein the end stop interacts in a self-locking manner with the locking detent of the easy-entry detent in one of the forward positions of the backrest.

12. The forward pivot mechanism as claimed in claim 1, wherein the end stop engages the softlock projection in at least one of the seat positions.

13. The forward pivot mechanism as claimed in claim 1, wherein the end stop engages the easy entry projection in at least one other of the seat positions.

14. The forward pivot mechanism as claimed in claim 1, wherein the end stop is movable relative to the separate rear stop.

15. The forward pivot mechanism as claimed in claim 1, wherein the easy-entry detent is movable relative to the separate rear stop.

16. The forward pivot mechanism as claimed in claim 1, wherein the softlock component is movable relative to the end stop and the easy-entry detent.

17. The forward pivot mechanism as claimed in claim 1, wherein the easy-entry detent is pivotally mounted to a fitting lower part.

18. A forward pivot mechanism for positioning a backrest of a vehicle seat into at least one forward position and for positioning the backrest beyond the forward position into at least one further forward position, the forward pivot mechanism comprising:
 a comfort locking mechanism for positioning and locking the backrest into at least one of a plurality of seat positions;
 an easy-entry detent for positioning the backrest into the at least one forward position, the easy-entry detent comprising a locking detent and a contour that includes an easy-entry projection;
 an end stop located on the backrest and configured to engage the easy-entry detent; and
 a softlock component comprising a contour that includes at least one softlock projection,
 wherein a pivoting range of the backrest into one of the forward positions is limitable by the easy-entry detent, wherein the easy-entry detent is designed in such a manner that, during the adjustment of the backrest from one of the seat positions into one of the forward positions, the locking detent of the easy-entry detent acts as a front stop when the easy-entry detent is brought into a position in which the locking detent comes into engagement with the end stop, which holds the backrest in the at least one forward position,
 wherein the end stop strikes against a separate rear stop in a rearmost seat position, wherein the separate rear stop is fixed to one of a floor or a seat part and limits the amount of rearward adjustment of the backrest,
 wherein the easy-entry detent is movable relative to the separate rear stop.

* * * * *